United States Patent
Drake et al.

(10) Patent No.: US 9,948,472 B2
(45) Date of Patent: Apr. 17, 2018

(54) PROTOCOL INDEPENDENT MULTICAST SPARSE MODE (PIM-SM) SUPPORT FOR DATA CENTER INTERCONNECT

(71) Applicant: Juniper Networks, Inc., Sunnyvale, CA (US)

(72) Inventors: John E. Drake, Pittsburgh, PA (US); Zhaohui Zhang, Westford, MA (US); Wen Lin, Andover, MA (US); Tapraj Singh, San Ramon, CA (US)

(73) Assignee: Juniper Networks, Inc., Sunnyvale, CA (US)

(*) Notice: Subject to any disclaimer, the term of this patent is extended or adjusted under 35 U.S.C. 154(b) by 455 days.

(21) Appl. No.: 14/580,185

(22) Filed: Dec. 22, 2014

(65) Prior Publication Data
US 2016/0119156 A1 Apr. 28, 2016

Related U.S. Application Data

(60) Provisional application No. 62/067,362, filed on Oct. 22, 2014.

(51) Int. Cl.
*G06F 15/173* (2006.01)
*H04L 12/18* (2006.01)
*H04L 12/46* (2006.01)
*H04L 12/761* (2013.01)

(52) U.S. Cl.
CPC .......... *H04L 12/18* (2013.01); *H04L 12/1886* (2013.01); *H04L 12/4641* (2013.01); *H04L 12/4654* (2013.01); *H04L 45/16* (2013.01)

(58) Field of Classification Search
CPC ........................................... H04L 12/18
See application file for complete search history.

(56) References Cited

U.S. PATENT DOCUMENTS

2008/0186968 A1* 8/2008 Farinacci ............ H04L 12/4633
370/392

OTHER PUBLICATIONS

Fenner, "RFC 4601: Protocol Independent Multicast—Sparse Mode (PIM-SM) Protocol Specification", IETF, Aug. 2006.*
Fenner, "RFC 4601", IETF Aug. 2006.*
Extended Search Report from counterpart European Application No. 15190161.8, dated Mar. 11, 2016, 11 pp.
Sajassi et al., "A Network Virtualization Overlay Solution Using E-VPN," NVO3 Workgroup, Internet Draft: draft-5sajassi-nvo3-evpn-overlay-01, Oct. 22, 2012, 16 pp.

(Continued)

*Primary Examiner* — Michael Y Won
*Assistant Examiner* — Nicholas Celani
(74) *Attorney, Agent, or Firm* — Shumaker & Sieffert, P.A.

(57) ABSTRACT

Techniques are described for utilizing Protocol Independent Multicast Sparse Mode (PIM-SM) to transport BUM (broadcast, unknown unicast, and multicast) traffic in a Virtual Extensible LAN (VXLAN) underlay of a data center, where the BUM traffic is received on active-active, multi-homed Ethernet virtual private network (EVPN) interconnects between multiple physical data centers. For example, the techniques may readily be applied to support usage of PIM-SM where provider edge (PE) routers of the EVPN operate as gateways between the EVPN and the VXLAN spanning the data center interconnect.

18 Claims, 5 Drawing Sheets

(56) References Cited

OTHER PUBLICATIONS

Bhikkaji et al., "Connecting TRILL-based Data Center/PBB/Campus sites using BGP," L2VPN Working Group, Internet Draft: draft-balaji-l2vpn-trill-over-ip-multi-level-02, Aug. 3, 2012, 37 pp.
Bitar et al., "Technologies and Protocols for Data Center and Cloud Networking," IEE Communications Magazine, Sep. 2013, 8 pp.
Boutros et al., "VXLAN DCI Using EVPN," draft-boutros-l2vpn-vxlan-evpn-04.txt, Internet Draft, Informational, Jul. 2014, 14 pp.
Response to Extended Search Report dated Mar. 11, 2016, from counterpart European Application No. 15190161.8, filed Oct. 24, 2016, 3 pp.

\* cited by examiner

PROTOCOL INDEPENDENT MULTICAST SPARSE MODE (PIM-SM) SUPPORT FOR DATA CENTER INTERCONNECT

PRIORITY CLAIM

This application claims the benefit of U.S. Provisional Application No. 62/067,362, filed Oct. 22, 2014, the entire content of which is incorporated herein by reference.

TECHNICAL FIELD

The invention relates to computer networks and, more specifically, to forwarding multicast traffic within data centers.

BACKGROUND

A data center is a specialized facility that provides data serving and backup as well as other network-based services for subscribers and other entities. A data center in its most simple form may consist of a single facility that hosts all of the infrastructure equipment, such as networking and storage systems, servers, redundant power supplies, and environmental controls.

More sophisticated data centers may be provisioned for geographically dispersed organizations using subscriber support equipment located in various physical hosting facilities (sites). As a result, techniques have been developed to interconnect two more physical data centers to form a single, logical data center. One example layer two (L2) interconnect is an Ethernet virtual private network (EVPN) interconnect through an intermediate network coupling multiple physical data centers.

SUMMARY

This disclosure describes techniques for supporting Protocol Independent Multicast Sparse Mode (PIM-SM) to transport traffic in a Virtual Extensible LAN (VXLAN) underlay of a data center, where the BUM traffic is received on active-active, multi-homed Ethernet virtual private network (EVPN) interconnects between multiple physical data centers. For example, the techniques may readily be applied to support usage of PIM-SM where provider edge (PE) routers of the data centers operate as gateways between the VXLAN and the EVPN spanning the data center interconnect. In this example environment, the VXLAN may be multi-homed to provide protection and load balancing, and in some situations is may be desirable to utilize PIM-SM to deliver so-called "BUM" traffic, i.e., broadcast, unknown unicast and multicast traffic in the VXLAN.

In one example, a method comprises: establishing an Ethernet virtual private network (EVPN) data center interconnect (DCI) between a first data center running a virtual extensible local area network (VXLAN) and a second data center, wherein the VXLAN of the first data center is active-active multi-homed to two or more provider edge (PE) routers of the EVPN and includes VXLAN tunnels established using protocol independent multicast-sparse mode (PIM-SM). The method further includes receiving, with one of the two or more multi-homed PE routers from the EVPN, BUM (broadcast, unknown unicast, and multicast) traffic, wherein the one of the two or more multi-homed PE routers is not a designated forwarder (DF), and forwarding the BUM traffic from the one of the two or more multi-homed PE routers into the VXLAN toward the first data center according to EVPN BUM forwarding rules.

In another example, a router comprises a routing engine having a processor executing an Ethernet virtual private network (EVPN) protocol to establish a data center interconnect (DCI) between a first data center running a virtual extensible local area network (VXLAN) and a second data center using an Ethernet virtual private network (EVPN). The router is one of a plurality of active-active routers multi-homed to the data center and providing the EVPN DCI, and wherein the routers establish VXLAN tunnels to transport traffic through the first data center using protocol independent multicast-sparse mode (PIM-SM). The one of the two or more multi-homed PE routers is not a designated forwarder (DF). The router further includes a forwarding engine having a plurality of network interfaces to receive BUM (broadcast, unknown unicast, and multicast) traffic and forward the BUM traffic from the one of the two or more multi-homed PE routers into the VXLAN toward the first data center according to EVPN BUM forwarding rules.

In another example, a computer-readable medium comprising instruction that cause a processor of a router of a plurality of active-active multi-homed routers of an Ethernet virtual private network (EVPN) to establish, with the processor of the router, a data center interconnect (DCI) between a first data center running a virtual extensible local area network (VXLAN) and a second data center using the EVPN, wherein the VXLAN is active-active multi-homed to the plurality of routers of the EVPN and includes VXLAN tunnels established using protocol independent multicast-sparse mode (PIM-SM) between the first data center and the two or more multi-homed PE routers. The instruction further cause the computer-readable medium to program, with the processor of the router, a forwarding unit of the router to: receive, with one of the two or more multi-homed PE routers from the EVPN, BUM (broadcast, unknown unicast, and multicast) traffic; and forward the BUM traffic from the router into the VXLAN toward the first data center according to EVPN BUM forwarding rules specifying that any of the multi-homed PE routers are to forward the BUM traffic into the VXLAN regardless of which of the PE routers is the specified as a designated forwarder (DF) for the EVPN The details of one or more examples are set forth in the accompanying drawings and the description below.

DETAILED DESCRIPTION

Figure 1:
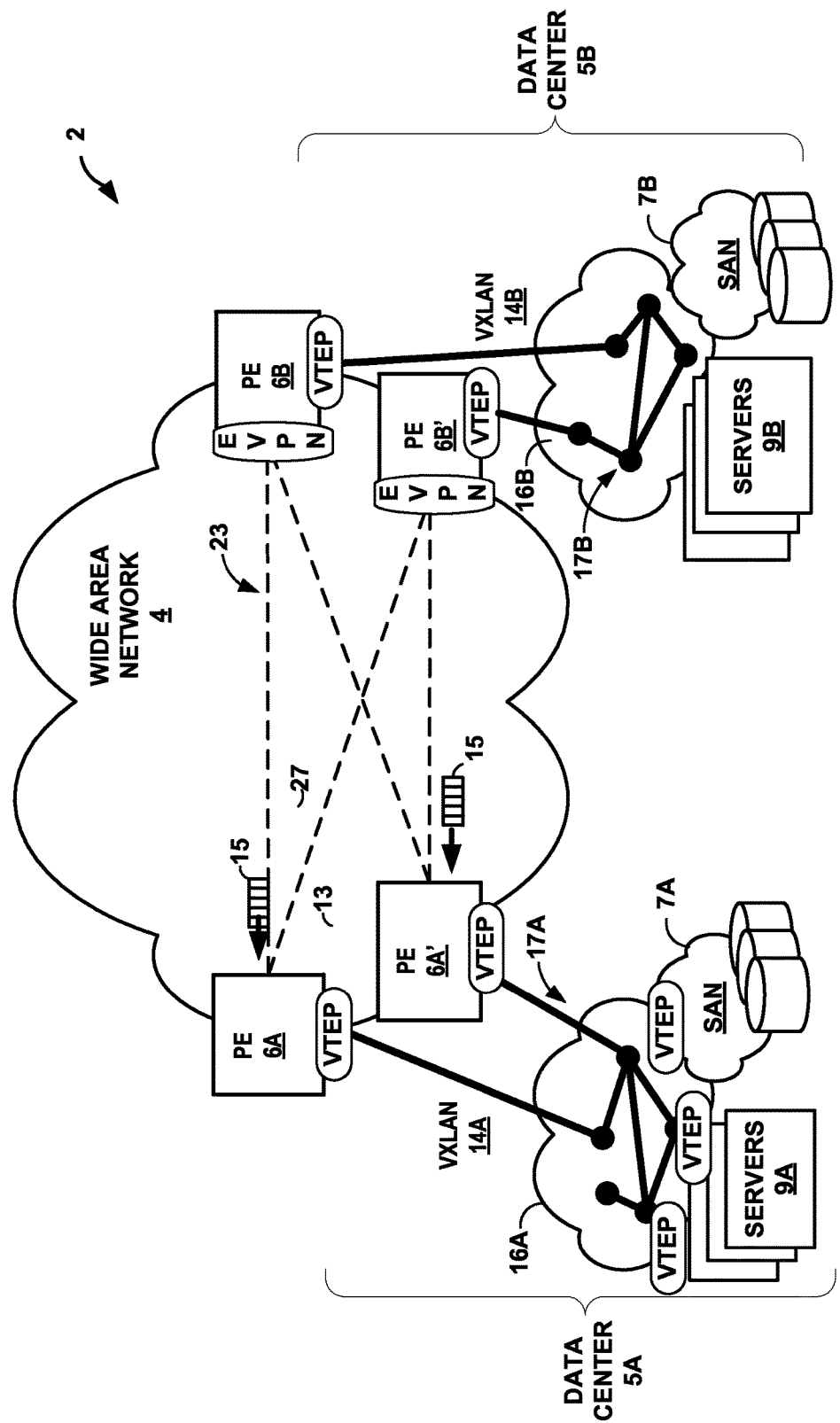
FIG. 1 is a block diagram illustrating an example network system in which routers provide Protocol Independent Multicast Sparse Mode (PIM-SM) support for data center interconnect between multiple physical data centers.

FIG. 1 is a block diagram illustrating an example network system in which routers provide Protocol Independent Multicast Sparse Mode (PIM-SM) support for data center interconnect between multiple physical data centers. In this example, data centers 5A-5B (collectively, "data centers 5") are networks having specialized facilities that provide storage, management, and dissemination of data to subscribers and other entities. In the example of FIG. 1, data centers 5A, 5B includes a plurality of servers 9A, 9B and storage area networks (SANs) 7A, 7B respectively that provide computing environments for subscribers/customers. Subscriber devices (not shown) may connect to data centers 5 to request and receive services and data provided by data centers 5. In some instances, data centers 5A, 5B are geographically dispersed facilities, or "sites," of an overall data center to provide geographical redundancy against localized failure of one of the data centers.

In this example, data centers 5 are interconnected by a wide area network (WAN). In general, WAN 4 represents a layer three (L3) network and may include multiple intermediate routing and switching devices (not shown) that transport data traffic over links between data centers 5. For example, wide area network 4 may implement Multiprotocol Label Switching (MPLS) techniques and may be referred to as an MPLS/IP network. While described as a wide area network, WAN 4 may represent any network capable of transmitting traffic exchanged between provider edge routers (PEs) 6.

For example, provider edge routers (PEs) 6A, 6A', 6B and 6B' (collectively, "PEs 6") may utilize Ethernet VPN (E-VPN) technology through WAN 4 to provide an EVPN data center interconnect (DCI) between data centers 5A and 5B. In this way, PEs 6 provide an EVPN 23 to transport L2 communications for customer networks of data centers 5 through an intermediate network (WAN 4), in a transparent manner, i.e., as if the intermediate network does not exist and data centers 5 were instead directly connected.

In particular, each of PEs 6 provide the EVPN 23 to transport L2 communications, such as Ethernet packets or "frames," through WAN 4 for different customers of data centers 5. That is, various customer networks provided within data centers 5 may be virtually isolated onto different Virtual Extensible LANs (VXLANs) 14. As shown in FIG. 1, each of data centers 5 includes an underlay network 17A, 17B of transport routers that transport L2 communications through a respective VXLANs 14. As such, PEs 6 may receive customer traffic from local VXLANs 14 and forward the traffic through WAN 4 via the EVPN 23. Similarly, PEs 6 may receive L2 communications from EVPN 23 and forward the L2 communications via VXLANs 14 for transport through the local data centers 5 via underlay networks 17.

In this way, PEs 6 provide an active-active, multi-homed EVPN/VXLAN data center interconnect (DCI) between data centers 5. As such, each of PEs 6 operates as gateway between EVPN 23 and VXLANs, and may function as VXLAN Tunnel Endpoints (shown as "VTEP" in FIG. 1). That is, each PE 6 may include logically separate routing instances for VXLAN 14 and EVPN 23 and each operates to bridge traffic between the two distinct internal routing instances. Further example structural and functional details of the EVPN/VXLAN DCI implemented by PE routers 6 are described in "VXLAN DCI Using EVPN," draft-boutros-l2vpn-vxlan-evpn-04.txt, Internet Engineering Task Force (IETF), Jul. 2, 2014, the entire contents of which are incorporated herein by reference.

As shown in FIG. 1, each data center 5A, 5B is multi-homed to WAN 4 for redundancy and load balancing. That is, PE routers 6A, 6A' are configured to operate as multi-homed PEs of a single-active or an active-active multi-homed VXLAN 14A to provide L2 connectively to customer edge router (CE) 18A of data center 5A. Similarly, PE routers 6B, 6B' are configured to operate as multi-homed PEs of a single-active or an active-active multi-homed Ethernet segment 14B to provide L2 connectively to CE 18B of data center 5B. As an all-active multi-homing of the VXLAN network to MPLS/IP WAN network 4, traffic from a VTEP can arrive at any of PEs 6 of that Ethernet segment 14 and can be forwarded accordingly over the MPLS/IP WAN network 4. Furthermore, traffic destined to a VTEP can be received over the MPLS/IP network at any of the PEs connected to the VXLAN network and be forwarded accordingly. In some examples, the VXLAN network may alternatively be a NVGRE network.

When forwarding L2 communications (e.g., VXLAN packets) traversing EVPN 23, PEs 6 learn L2 state information for the L2 customer networks within data centers 5. The L2 state information may include media access control (MAC) addressing information associated with the network devices and customer equipment (e.g., virtual machines) within data centers 5 and the ports and/or pseudowire of the PE through which the customer devices are reachable. PEs 6 typically store the MAC addressing information in L2 learning tables associated with each of their interfaces.

With active-active multi-homing, PEs 6 of a multi-homed Ethernet segment connected to the same logical VXLAN are typically configured with a common anycast address. For example, PEs 6A and 6A' of FIG. 1 would typically be configured with the same common anycast address for the underlay tunnels through underlay networks 17. As such, PEs 6A, 6A' (and similarly PE 6B, 6B') are viewed as a single logical PE from the perspective of the remote PEs across WAN 4 and also from routers within local VXLAN underlay networks 17. This may be advantageous, for example, to avoid MAC learning flip-flopping on remote VTEPs (e.g., PEs 6B and 6B') in the event VXLAN traffic is received first from one of PEs 6A, 6A' and then received from the other of the PEs.

In general, routers within underlay network 17 as well as CEs 18 and PEs 6 execute a multicast routing protocol such as protocol independent multicast (PIM) to control transport of multicast traffic within each data center 5. In some examples, the routers may support both Protocol Independent Multicast Bidirectional Mode (PIM-BIDIR) and Protocol Independent Multicast Sparse Mode (PIM-SM).

With respect to broadcast, unknown unicast or multicast L2 traffic, so called "BUM" traffic, received from the EVPN 23 of WAN 4, one of the PEs 6 of EVPN 23 is elected as the designated forwarder (DF), and conventionally only the DF is allowed to forward BUM traffic to the VXLAN according to EVPN BUM traffic forwarding rules. To transport BUM traffic within the VXLAN underlay networks, PIM-BIDIR is commonly used because the protocol is compatible with use of a common anycast address assigned to multiple PEs in the active-active mode. In some environments, however, it is desirable to also support or otherwise utilize PIM-SM within underlay networks for delivery of BUM traffic received from EVPN 23. However, conventionally, PIM-SM is generally not compatible with active-active, multi-homed EVPN environments that, for example, use a common anycast addresses for multiple PEs.

This disclosure describes techniques that allow PIM-SIM to be used in network topologies having an EVPN/VXLAN DCI when the VXLAN networks are multi-homed to EVPN PEs working in all-active mode (e.g., FIG. 1). As described herein, multi-homed PEs 6 configure forwarding planes therein to apply modified EVPN BUM traffic forwarding rules in a manner that allows PIM-SM to be utilized within VXLANs 14 even though active-active pairs of PEs 6 for each data center 5 share a common anycast address. Moreover, the techniques ensure that BUM traffic 15 received from EVPN 23 can be delivered to all the remote VTEPs in the VXLAN underlay network 17. That is, if configured by an administrator or management system, PEs 6, whether operating as a DF or non-DF for EVPN 23, forward BUM traffic 15 from the EVPN 23 into the VXLAN for transport through data centers 5. In other words, when underlay network 17 is configured to operate using PIM-SM, PE routers 6 may automatically configure their respective forwarding hardware (referred to herein as forwarding units or data planes) to operate according to modified forwarding rules that specify that all PE routers forward all BUM traffic from EVPN 23 to underlay tunnels of VXLAN underlay network 17 traversing data centers 5 regardless of which of the PE routers for each Ethernet segment 14 is elected as DF for that segment.

For example, as described in further detail below, the techniques described by which multiple ones of the active-active, multi-homed PEs 6A, 6A' construct respective multicast distribution trees to forward BUM traffic 15 through VXLAN 14A. In this way, PEs 6A, 6A' operate according to modified EVPN BUM traffic forwarding rules to forward subsequent BUM traffic 15 from EVPN 23 and into the VXLAN tunnels of underlay network 17A. As such, without changing the PIM protocols, multiple distribution trees are transparently created and rooted on potentially multiple EVPN routing instances of multi-homed PEs 6A, 6A' and are utilized in an active-active, EVPN environment of FIG. 1. Moreover, as further described below, the techniques leverage reverse path forwarding (RPF) check utilized within PIM-SM to ensure that duplicate copies of BUM traffic 15 will be filtered out by the transport routers prior to the multiple copies reaching their destinations (e.g., servers 9A or SAN 14A).

Figure 2A:
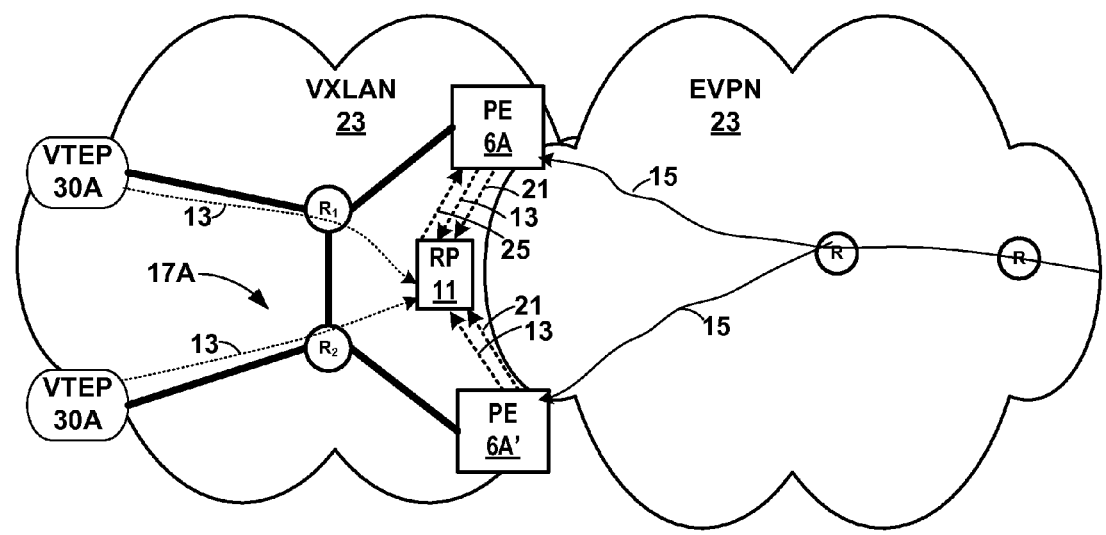
FIGS. 2A-2C are block diagrams illustrating in further detail portions of the example network system of FIG. 1.
Figure 2B:
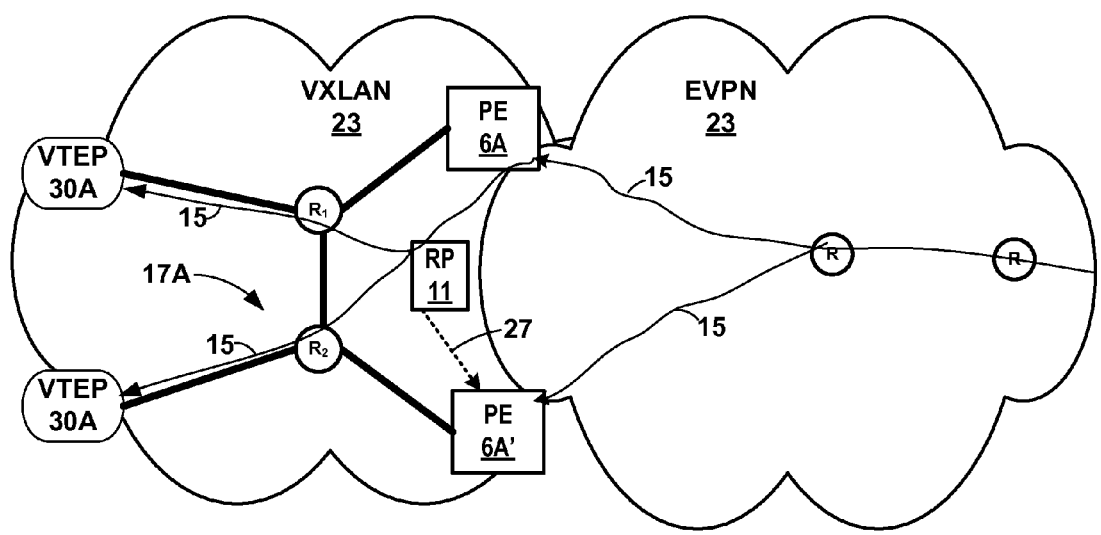
Figure 2C:
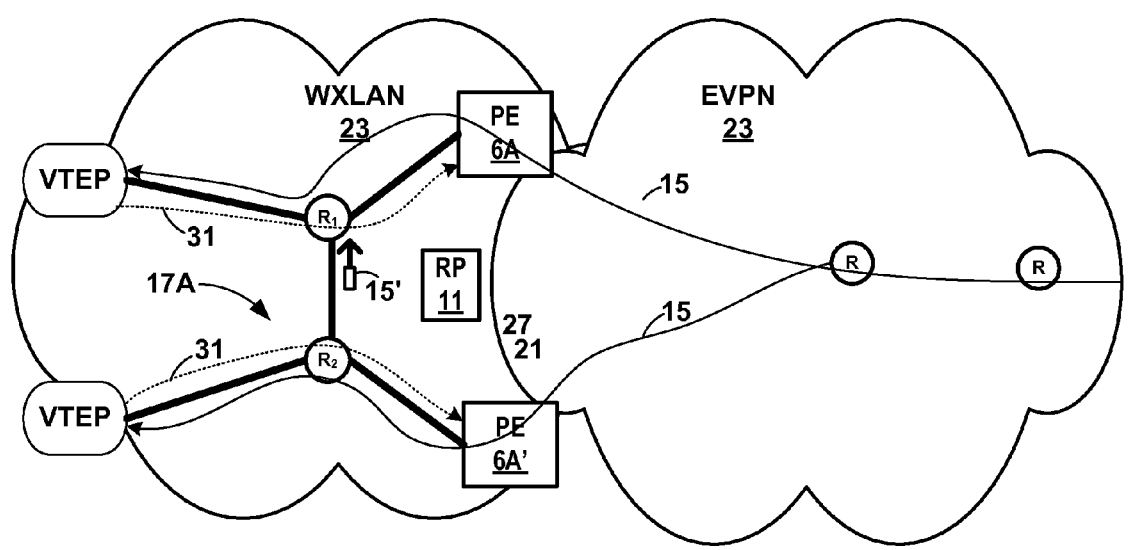

FIGS. 2A-2C are block diagrams illustrating in further detail portions of the example network system of FIG. 1 in accordance with the techniques described herein. As shown in FIG. 2A, initially, all VTEPs for a local VXLAN, including VTEP routing instances executing on any transport routers of underlay networks 17 and PEs 6 for that VXLAN, issue (*,G) PIM joins 13 to initiate multicast traffic for a multicast group (G). Specifically, initial PIM joins 13 from VTEP instances for a VXLAN are directed to a designated Rendezvous Point (RP) 11 for the multicast group for that particular VXLAN. As further described below, RP 11 is a router or other device that has been designated to acts as a shared root for a (*, G) multicast tree that will be, or has been, constructed for subsequent injection of multicast traffic for the multicast group into the VXLAN. In general, multicast traffic sent from a sender is typically tunneled to RP 11, and such tunneled traffic is referred to as "non-native" multicast traffic, which RP 11 would in turn forward as a shared root on the (*, G) distribution tree for a given multicast group (G). Although shown separately from PE routers 6, RP 11 may configured to execute on any of PE routers 6 or on a separate device.

When copies of a first BUM packet 15 associated with the requested multicast flow arrive on the EVPN routing instance of PE routers 6, all receiving EVPN PEs 6 will send PIM register messages 21 to the RP 11 as an indication that the particular multicast traffic is now being received at the particular PE router and that the PE router may now operate as a particular source (S) for the multicast traffic with respect to the PIM-based distribution of the traffic within data center 5A. The multicast flow associated with BUM traffic 15 may be uniquely identified within the PIM register messages 21 as a combination of an anycast address assigned to PEs 6 for EVPN 23 and the multicast group, i.e., an (S,G) PIM register message, where S is set to the anycast address of the multi-homed VXLAN 14A. Moreover, each of PIM register messages 21 may have a source address of the sending interface of the PE router instead of the anycast address on the PE 6 that originated the PIM register message. In this way, RP 11 may be able to uniquely associate each of PIM messages 21 with the sender, i.e., a respective one of PE routers 6A.

Upon receiving a (S,G) PIM register message 21, RP 11 selects one of the multi-homed, active-active PE routers 6A, 6A' from which register messages 21 have been received and sends an (S,G) PIM join 25 for the flow uniquely identified in the PIM register message by the combination of the EVPN anycast address of PE routers 6A, 6A' and multicast group. PIM join request 25 may be directed toward a closest one of the multi-homed PEs 6A, 6A' regardless of whether the PE to which the PIM join is directed is the DF or a non-DF for all-active EVPN 23, where "closest" refers to the lowest weight route from RP 11 to any of the PEs based on a standard path computation (e.g., OSPF path computation) performed on the network domain.

As shown in FIG. 2B, in response, the receiving one of PEs 6A, 6A' initiates a handoff process by forwarding any subsequent BUM traffic 15 for the identified flow natively (i.e., as native multicast without encapsulation) to RP, which in turn distributes the BUM traffic into data center 5 on the (*, G) PIM multicast distribution tree. While receiving the native traffic 15' and temporarily operating as a root for the (*, G) distribution tree into data center 5A, RP 11 will send respective register-stop messages to any of PEs 6 that subsequently send register messages specifying the same multicast flow (e.g., register-stop message 27 sent to PE 6A'). As such, only one PE 6A, 6A' receives a (S,G) PIM join 25 for a given combination of a multicast group and anycast address for VXLAN 14A of EVPN 23. Moreover, only one of the active-active routers PE 6 switches to native forwarding of BUM traffic 15 to RP 11, which in the example of FIG. 1 is PE router 6A. That is, in this example, PE 6A receives PIM join 25 from RP 11 for the specific multicast group, anycast address combination and PE router 6A' receives register-stop message 27 for the combination. As such, upon receiving these messages, PE router 6A switches to native forwarding all subsequent BUM traffic 15 for the combination to RP 11, and RP 11 in turn forwards the BUM traffic along the (*,G) distribution tree so as to inject BUM traffic into the VXLAN of data center 5A. PE router 6A', upon receiving register-stop message 27 stops issuing subsequent register messages 21. In this way, RP 11 operates as temporary (*,G) surrogate for the (anycast, G) source of the multicast traffic for forwarding the traffic within VXLAN of data center 5A and the underlying transport network 17A.

In one example implementation, PE routers 6A, 6A' encapsulate initial BUM packets 15 within PIM register messages 21 directed to RP 11. In such examples, prior to RP 11 receiving the first natively sent BUM traffic 15 from any of PEs 6A, 6A' for direction into VXLAN 14A, RP 11 extracts the BUM packets encapsulated in register messages 21 and forwards the BUM traffic along the (*, G) multicast distribution tree. This may have the benefit of avoiding any loss of initial BUM traffic 15 while RP 11 issues PIM join 25 to one of PEs 6A, i.e., PE 6A' in the example of FIG. 1. However, this example implementation may also cause duplicate copies of initial BUM packets extracted from PIM register messages 21 received from both PE 6A and PE 6A'. This occurrence, however, will be transient and will stop as soon as the first native BUM packet 1 is received by RP 11. If transient duplication is a concern, some example implementations may utilize a null form of PIM register messages 21 that do not encapsulate BUM packets 15, but this implementation may lead to transient loss of initial BUM packets 15. To avoid packet loss and duplication, multihomed PEs 6A, 6A' may periodically send null PIM register messages 21 to RP 11 as soon as initial provisioning is completed to pre-build and maintain state for multicast flows to be injected into the VXLAN of data center 5A.

Next, as shown in FIG. 2C, when any of the VTEPs for VXLAN 17A (e.g., any of PEs 6A, 6A' or transport routers of transport network 17A acting as a VTEP), receive native multicast traffic 15 from RP 11 on the (*, G) distribution tree, the VTEP outputs PIM joins 31 for the particular (S, G) combination, where S is set to the anycast address for the VXLAN and G is set to the multicast group. As shown in FIG. 2C, each PIM join 31 is routed to the closest PE, i.e., any one of PE's 6A, 6A' that is closest to respective VTEP, where "closest" again refers to a lowest weight route that is selected from the VTEP to one of the PEs based on a standard path computation performed on the network domain. As such, multiple PEs 6A, 6A' may receive (S,G) PIM joins for the (anycast, group). This, in turn causes each of the receiving EVPN routing instances of PEs 6A, 6A' to construct a respective (S,G) multicast distribution tree for forwarding subsequent BUM traffic 15 for the (S,G) into data center 5A. In this way, multiple (S, G) distribution trees may be created, one for each of the PEs that is a closest PE to one of the VTEPs. In other words, according to PIM-SM, every VTEP sends an (S,G) PIM join 31, where S is the anycast address and G is the multicast Group. In turn, each receiving PE 6A, 6A' creates respective (S,G) PIM multicast distribution trees, each one rooted at the respective PE that is closest to the VTEP sender.

In the example of FIG. 2C, each of the PEs 6A, 6A' operates as roots for a respect PIM (S,G) multicast distribution trees, and each (S,G) multicast distribution tree is utilized to send BUM traffic 15 into data center 5A. As a result, handoff from the (*,G) distribution tree rooted at RP 11 to the multiple, (S,G) trees rooted at PEs 6A, 6A' occurs, and native forwarding of BUM traffic 15 may be triggered on multiple PEs 6A, 6A'. Every multi-homed PEs 6A, 6A' that receives an (anycast, G) PIM join 31 from a VTEP constructs a respective (anycast, G) multicast distribution tree and, in this way, operates according to modified EVPN BUM traffic forwarding rules to forward subsequent BUM traffic 15 from EVPN 23 and into the VXLAN tunnels of underlay network 17A. As such, without changing the PIM protocols, multiple S,G distribution trees are transparently created and rooted on potentially multiple EVPN routing instances of multi-homed PEs 6A and are utilized in an active-active, EVPN environment of FIG. 1.

Moreover, the techniques described herein leverage reverse path forwarding (RPF) check utilized within PIM-SM by which any transit router (e.g, R1 or R2) within underlay network 17A will only forward a BUM packet if the router received the BUM packet on an input interface that is facing the packet's source according to the internal IPG routing information, which in this case the root PE 6A or PE 6A' for the particular (S, G) multicast distribution tree on which the multicast traffic is expected to be received. For example, applying RPF, router R1 drops any BUM traffic 15' received on an interface that is not directed upstream along a path to PE 6A, i.e., the root of the multicast distribution tree on which router R1 expects to receive the BUM traffic. As such, even though multiple copies of native BUM traffic 15 may be injected into underlay networks 17A from active-active PE routers 6A, 6A' the multiple copies will be filtered out by the transport routers prior to the multiple copies reaching their destinations (e.g., servers 9A or SAN 14A) as the transport routers apply RFP check when transporting the packets using PIM-SM.

As such, the RFP check performed by PIM-SM executing on individual routers within underlay network 17A ensures that the routers only forward copies of BUM traffic 15 received on interfaces designated as upstream interfaces the source of the (S, G) tree. In the event BUM traffic 15 stops for a threshold period of time, relevant PIM state described above may time out and be cleared, and any subsequent BUM packets 15 will trigger the above process again.

In this way, the techniques allow an EVPN all-active interconnect 23 between data centers 5 to be used even when the data center multicast underlay networks 17 are running PIM sparse mode (SM) for transporting multicast traffic. As such, multiple PEs 6 attached to the same data center 5A or 5B can be configured with the same anycast IP address, which may provide stability to all unicast entries injected into a given data center from other data centers. This allows PEs 6A, 6A' to appear in the routing domain (e.g., IGP) of remote data 5B center as a single host.

As such, the techniques herein provide Protocol Independent Multicast Sparse Mode (PIM-SM) support for an active-active, multi-homed EVPN data center interconnect between multiple physical data centers. Although described with respect to BUM traffic flowing from EVPN 23 into the VXLAN of data center 5A, the techniques may readily be applied to any data center, e.g., data center 5B, having active-active, multi-homed PEs 6B, 6B' coupled to EVPN 23.

As discussed above, in a typical EVPN configuration, a single PE of an EVPN acts as the designated forwarder of BUM traffic and no other PE of the multi-homed, active-active EVPN forwards BUM traffic into the data center, thereby seeking to prevent packet forwarding loops and receipt of multiple copies of individual BUM packets. Moreover, it may be desirable to configured active-active, multi-homed EVPN PEs of an Ethernet segment with the same anycast address for stability with respect to remote routing domains. Conventional PIM SM protocol in which transport routers apply a reverse path forwarding (RPF) check causes the transit routers to only forward a BUM packet if the router received the BUM packet on an input interface that is toward the packet's source, which in conventional configuration is the IP anycast address configured on each of the PEs. As a result, if only one PE is selected as DF, conventional techniques cause some number of transit routers to discard a given BUM packet because it was received on what the transit router decides is an invalid input interface. As described, this disclosure describes techniques that allow each PE 6 of a multi-homed segment 14, regardless of DF election, to sends BUM traffic from EVPN 23 toward the local data center 5 and rely upon the operation of the RPF check of PIM-SM applied by transit routers of underlay networks 17 to prevent packet forwarding loops and receipt of multiple copies of individual BUM frames within the data centers.

Figure 3:
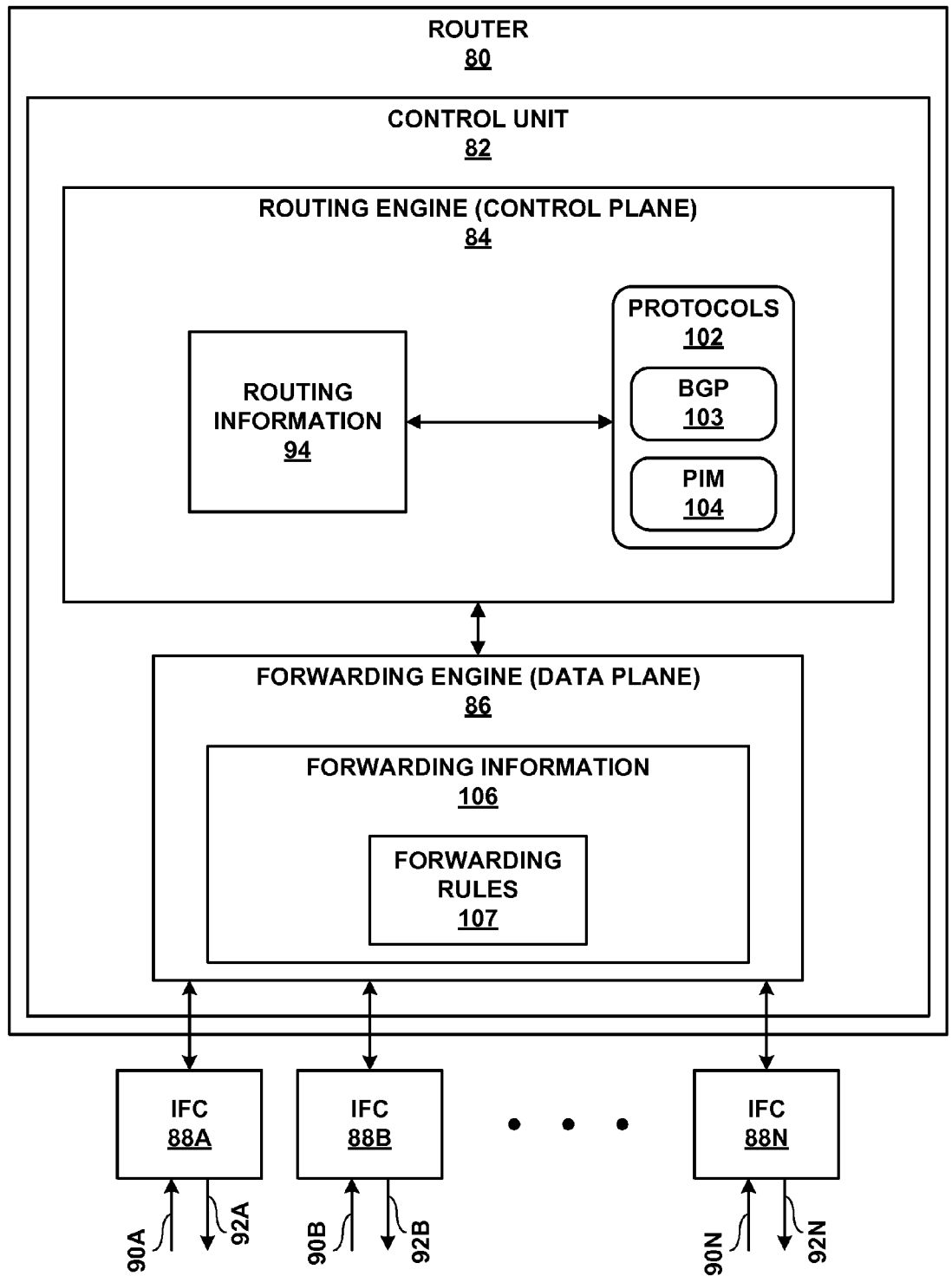
FIG. 3 is a block diagram illustrating an exemplary router capable of performing the disclosed techniques.
Figure 4:
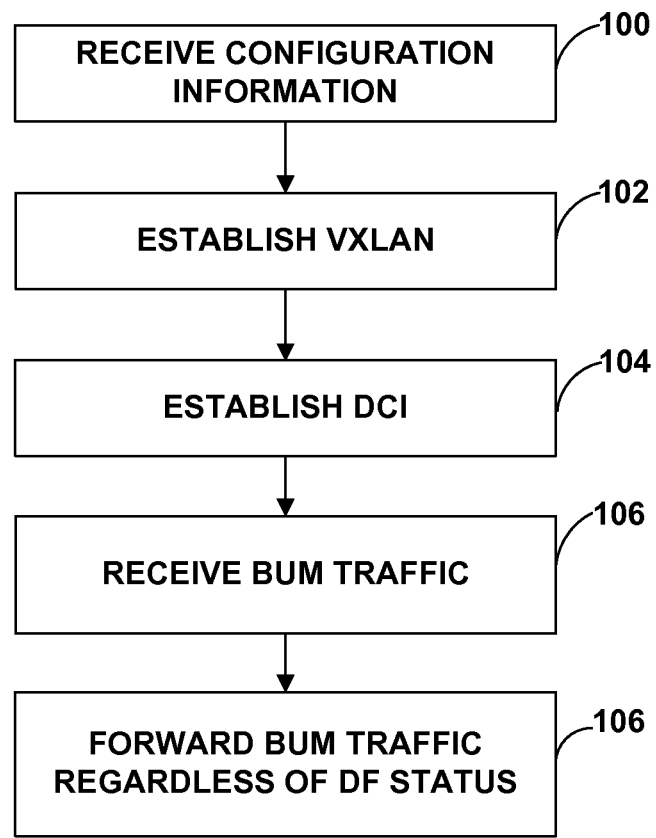
FIG. 4 is a flow diagram illustrating example operation of a router in accordance with the techniques described herein.

FIG. 3 is a block diagram illustrating an exemplary router 80 capable of performing the disclosed techniques. In general, router 80 may operate substantially similar to PEs 6 of FIG. 1

In this example, router 80 includes interface cards 88A-88N ("IFCs 88") that receive multicast packets via incoming links 90A-90N ("incoming links 90") and send multicast packets via outbound links 92A-92N ("outbound links 92"). IFCs 88 are typically coupled to links 90, 92 via a number of interface ports. Router 80 also includes a control unit 82 that determines routes of received packets and forwards the packets accordingly via IFCs 88.

Control unit 82 may comprise a routing engine 84 and a packet forwarding engine 86. Routing engine 84 operates as the control plane for router 80 and includes an operating system that provides a multi-tasking operating environment for execution of a number of concurrent processes. Routing engine 84 may implement one or more routing protocol 102 to execute routing processes. For example, routing protocols 102 may include Border Gateway Protocol (BGP) 103, for exchanging routing information with other routing devices and for updating routing information 94. In addition, routing protocols 102 may include PIM 104, and specifically PIM-SM, for routing multicast traffic in accordance with the techniques described herein.

Routing information 94 may describe a topology of the computer network in which router 80 resides, and may also include routes through the shared trees in the computer network. Routing information 94 describes various routes within the computer network, and the appropriate next hops for each route, i.e., the neighboring routing devices along each of the routes. Routing engine 84 analyzes stored routing information 94 and generates forwarding information 106 for forwarding engine 86. Forwarding information 106 may associate, for example, network destinations for certain multicast groups with specific next hops and corresponding IFCs 88 and physical output ports for output links 92. Forwarding information 106 may be a radix tree programmed into dedicated forwarding chips, a series of tables, a complex database, a link list, a radix tree, a database, a flat file, or various other data structures.

In the illustrated example of FIG. 2, forwarding information 106 includes forwarding rules 107. For example, PIM-SM 104 may generate and store forwarding rules 107 to include modified EVPN BUM traffic forwarding rules. That is, according to forwarding rules 107, as an active-active PE router for a multi-homed VXLAN, forwarding unit 86 of router 80 may forward BUM traffic from the EVPN 23 into the VXLAN for transports through data centers 5. In other words, forwarding unit 86 may apply the modified forwarding rules 107 to forward all BUM traffic from EVPN 23 to underlay tunnels of the multi-homed VXLANs within data centers 5 regardless of DF status.

The architecture of router 80 illustrated in FIG. 2 is shown for exemplary purposes only. The invention is not limited to this architecture. In other examples, router 80 may be configured in a variety of ways. In one example, some of the functionally of control unit 82 may be distributed within IFCs 88. In another example, control unit 82 may comprise a plurality of packet forwarding engines operated as slave routers.

Control unit 82 may be implemented solely in software, or hardware, or may be implemented as a combination of software, hardware, or firmware. For example, control unit 82 may include one or more processors which execute software instructions. In that case, the various software modules of control unit 82 may comprise executable instructions stored on a computer-readable medium, such as computer memory or hard disk.

The techniques described herein may be implemented in hardware, software, firmware, or any combination thereof. Various features described as modules, units or components may be implemented together in an integrated logic device or separately as discrete but interoperable logic devices or other hardware devices. In some cases, various features of electronic circuitry may be implemented as one or more integrated circuit devices, such as an integrated circuit chip or chipset.

If implemented in hardware, this disclosure may be directed to an apparatus such a processor or an integrated circuit device, such as an integrated circuit chip or chipset. Alternatively or additionally, if implemented in software or firmware, the techniques may be realized at least in part by a computer-readable data storage medium comprising instructions that, when executed, cause a processor to perform one or more of the methods described above. For example, the computer-readable data storage medium may store such instructions for execution by a processor.

A computer-readable medium may form part of a computer program product, which may include packaging materials. A computer-readable medium may comprise a computer data storage medium such as random access memory (RAM), read-only memory (ROM), non-volatile random access memory (NVRAM), electrically erasable programmable read-only memory (EEPROM), Flash memory, magnetic or optical data storage media, and the like. In some examples, an article of manufacture may comprise one or more computer-readable storage media.

In some examples, the computer-readable storage media may comprise non-transitory media. The term "non-transitory" may indicate that the storage medium is not embodied in a carrier wave or a propagated signal. In certain examples, a non-transitory storage medium may store data that can, over time, change (e.g., in RAM or cache).

The code or instructions may be software and/or firmware executed by processing circuitry including one or more processors, such as one or more digital signal processors (DSPs), general purpose microprocessors, application-specific integrated circuits (ASICs), field-programmable gate arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, functionality described in this disclosure may be provided within software modules or hardware modules.

FIG. 3 is a flow diagram illustrating example operation of a router, such as any of PE routers 6 of FIG. 1, in accordance with the techniques described herein.

Initially, a router receives configuration information specifying BUM traffic forwarding rules as described herein (100). The forward rules may, for example, specify that when operating as a VTEP for a VXLAN of a data center that is connected to a remote data center via an EVPN, the router is to forward BUM traffic from the EVPN into the VXLAN toward the data center according to EVPN BUM forwarding rules regardless of whether the router is configured as a designated forwarder (DF) for a plurality of multi-homed routers coupling the data center to the EVPN. The router may receive the configuration information from a centralized controller, such as a software defined networking (SDN) controller, from a management system via a configuration protocol (e.g., SNMP), from a local interface or other example mechanisms.

Once configured and operational, the router operates as a VTEP to establish VXLAN tunnels established using protocol independent multicast-sparse mode (PIM-SM) with transport routers within the data center (102). In addition, the router establishes a layer two (L2) data center interconnect (DCI) between the data center running the VXLAN and the second, remote data center (104). The DCI may, for example, be established using an Ethernet virtual private network (EVPN). As such, the router operates as one of a plurality of active-active routers that provided multihomed connectivity for the VXLAN of the data center to the EVPN DCI providing connectivity to the remote data center.

Once the EVPN has been established, the router may receive BUM (broadcast, unknown unicast, and multicast) traffic from the remote data center by way of the EVPN DCI (106). In accordance with the process described above, multiple (S,G) multicast distribution trees may be transparently created with each of the trees rooted on a different EVPN routing instances of a multi-homed, active-active PE router. Moreover, this may occur even for routers that are not designated forwarders for the multi-homed PE routers operating as an Ethernet segment for the EVPN.

Each of the router operating as a root for the (S,G) multicast distribution tree operates to forward BUM traffic into the VXLAN toward the first data center according to EVPN BUM forwarding rules, wherein the EVPN BUM forwarding rules specify that any of the multi-homed PE routers may forward the BUM traffic into the VXLAN regardless of which of the PE routers is the DF (108). For example, operating as root for an (S, G) multicast distribution tree that has been created, any of the routers may forward the BUM traffic into an appropriate VXLAN tunnel even though the router is not the designated forwarder for the EVPN. Further, as described above, reverse path forwarding (RPF) check utilized within PIM-SM is leveraged to filter any redundant copies of BUM traffic received from the EVPN prior to the copies being delivered to the destinations.

Various embodiments have been described. These and other embodiments are within the scope of the following examples.

The invention claimed is:

1. A method comprising:
   establishing an Ethernet virtual private network (EVPN) data center interconnect (DCI) between a first data center running a virtual extensible local area network (VXLAN) and a second data center, wherein the VXLAN of the first data center is active-active multi-homed to two or more provider edge (PE) routers of the EVPN and includes VXLAN tunnels established using protocol independent multicast-sparse mode (PIM-SM), wherein the two or more PE routers comprise a first PE router and a second PE router, wherein the second PE router is a designated forwarder (DF) for the two or more PE routers, and wherein the first PE router is not a DF for the two or more PE routers, wherein the first PE router has a common anycast address corresponding to an anycast address of the second PE router;
   in response to receiving first BUM (broadcast, unknown unicast, and multicast) traffic for a first multicast group:
      prior to receiving a join message for the common anycast address and the first multicast group from a rendezvous point (RP) for the first multicast group, sending, from the first PE router and to the RP for the first multicast group, a PIM register message for the first BUM traffic with a multicast flow identified using a combination of the common anycast address and the first multicast group, wherein the two or more PE routers use the common anycast address for the VXLAN tunnels established using PIM-SM, and
      in response to receiving the join message for the common anycast address and the first multicast group from the RP for the first multicast group, forwarding, by the first PE router, the first BUM traffic natively to the RP for the first multicast group and refraining, by the first PE router, from sending subsequent PIM register messages for the first BUM traffic, wherein the RP for the first multicast group forwards the first BUM traffic from the first PE router into the first data center; and
   in response to receiving second BUM traffic for a second multicast group:
      prior to receiving a register-stop message for the common anycast address and the second multicast group from an RP for the second multicast group, sending, from the first PE router and to the RP for the second multicast group, a PIM register message for the second BUM traffic with a multicast flow identified using a combination of the common anycast address and the second multicast group, and
      in response to receiving the register-stop message for the common anycast address and the second multicast group from the RP for the second multicast group, refraining, by the first PE router, from sending subsequent PIM register messages for the second BUM traffic and dropping, by the first PE router, the second BUM traffic.

2. The method of claim 1, wherein EVPN BUM forwarding rules installed on the two or more PE routers specify that any one of the two or more PE routers are to forward the BUM traffic into the VXLAN regardless of which one of the two or more PE routers is the DF.

3. The method of claim 1, wherein forwarding the first BUM traffic comprises:
   constructing a multicast distribution tree; and
   forwarding, with the first PE router, the first BUM traffic from the EVPN into the multicast distribution tree.

4. The method of claim 1, further comprising sending, from the second PE router or any one of a plurality of VXLAN tunnel end points (VTEPs), join messages toward the RP for the first multicast group.

5. The method of claim 1, wherein the PIM register message for the first BUM traffic indicates a unique source address of a sending interface of the first PE router.

6. The method of claim 1, wherein the first PE router is a closest one of the two or more PE routers to the RP for the first multicast group.

7. The method of claim 1, further comprising, in response to receiving the first BUM traffic natively from the first PE router, sending, by the RP for the first multicast group, to the second PE router, a register-stop message to stop the second PE router from sending a subsequent PIM register message to the RP for the first multicast group.

8. The method of claim 1, wherein the PIM register message for the first BUM traffic encapsulates a packet of the first BUM traffic.

9. The method of claim 1, wherein the PIM register message for the first BUM traffic comprises a null register message that does not encapsulate a packet of the first BUM traffic.

10. The method of claim 1, wherein each one of a plurality of VXLAN tunnel end points (VTEPs) only accepts the first BUM traffic from the first PE router.

11. A router comprising:
   a routing engine having a processor executing an Ethernet virtual private network (EVPN) protocol to establish a data center interconnect (DCI) between a first data center running a virtual extensible local area network (VXLAN) and a second data center using an Ethernet virtual private network (EVPN), wherein the router is one of a plurality of provider edge (PE) routers that are active-active and multi-homed to the first data center and that provide the EVPN DCI, wherein the plurality of PE routers are configured to utilize VXLAN tunnels to transport traffic through the first data center using protocol independent multicast-sparse mode (PIM-SM), wherein the router is not configured as a designated forwarder (DF) for the plurality of PE routers, wherein the plurality of PE routers includes a DF router that is configured as the DF for the plurality of PE routers, and wherein the router has a common anycast address corresponding to an anycast address of the DF router; and a forwarding engine having a plurality of network interfaces to:
   in response to receiving first BUM (broadcast, unknown unicast, and multicast) traffic for a first multicast group:
      prior to receiving a join message for the common anycast address and the first multicast group from a rendezvous point (RP) for the first multicast group, send, to the RP for the first multicast group, a PIM register message for the first BUM traffic with a multicast flow identified using a combination of the common anycast address and the first multicast group, wherein the plurality of PE routers uses the common anycast address for the VXLAN tunnels established using PIM-SM, and
      in response to receiving the join message for the common anycast address and the first multicast group from the RP for the first multicast group, forward the first BUM traffic natively to the RP for the first multicast group and refrain from sending subsequent PIM register messages for the first BUM traffic, wherein the RP for the first multicast group forwards the first BUM traffic from the router into the first data center; and
   in response to receiving second BUM traffic for a second multicast group:
      prior to receiving a register-stop message for the common anycast address and the second multicast group from an RP for the second multicast group, send, to the RP for the second multicast group, a PIM register message for the second BUM traffic with a multicast flow identified using a combination of the common anycast address and the second multicast group, and
      in response to receiving the register-stop message for the common anycast address and the second multicast group from the RP for the second multicast group, refrain from sending subsequent PIM register messages for the second BUM traffic and drop the second BUM traffic.

12. The router of claim 11, wherein EVPN BUM forwarding rules installed in the forwarding engine specify that any one of the plurality of PE routers are to forward the BUM traffic into the VXLAN regardless of which one of the plurality of PE routers is the DF.

13. The router of claim 11, wherein the routing engine is configured to operate as any one of the plurality of PE routers or any of a plurality of VXLAN tunnel end points (VTEPs).

14. The router of claim 11, wherein the router constructs the PIM register message to further specify a unique source address of a sending interface the router.

15. The router of claim 11, wherein the router is the closest one of the plurality of PE routers to the RP for the first multicast group.

16. The router of claim 11, wherein the PIM register message for the first multicast group encapsulates a packet of the first BUM traffic.

17. The router of claim 11, wherein the PIM register message for the first multicast group comprises a null register message that does not encapsulate a packet of the first BUM traffic.

18. A computer-readable medium comprising instruction that cause a processor of a router of two or more provider edge (PE) routers of an Ethernet virtual private network (EVPN) to:
   establish, with the processor of the router, a data center interconnect (DCI) between a first data center running a virtual extensible local area network (VXLAN) and a second data center using the EVPN, wherein the VXLAN of the first data center is active-active multi-homed to the two or more PE routers of the EVPN and includes VXLAN tunnels established using protocol independent multicast-sparse mode (PIM-SM) between the first data center and the two or more PE routers, wherein the two or more PE routers further comprises a DF router that is configured as a designated forwarder (DF) for the two or more PE routers and wherein the router is not configured as the DF for the two or more PE routers, wherein the router has a common anycast address corresponding to an anycast address of the DF router; and
   program, with the processor of the router, a forwarding unit of the router to:
      in response to receiving first BUM (broadcast, unknown unicast, and multicast) traffic for a first multicast group:
         prior to receiving a join message for the common anycast address and the first multicast group from a rendezvous point (RP) for the first multicast group, send, to the RP for the first multicast group, a PIM register message for the first BUM traffic with a multicast flow identified using a combination of the common anycast address and the first multicast group, wherein the two or more PE routers use the common anycast address for the VXLAN tunnels established using PIM-SM, and
         in response to receiving the join message for the common anycast address and the first multicast group from the RP for the first multicast group, forward the first BUM traffic natively to the RP for the first multicast group and refrain from sending subsequent PIM register messages for the first BUM traffic, wherein the RP for the first multicast group forwards the first BUM traffic from the router into the first data center; and
      in response to receiving second BUM traffic for a second multicast group:
         prior to receiving a register-stop message for the common anycast address and the second multicast group from an RP for the second multicast group, send, to the RP for the second multicast group, a PIM register message for the second BUM traffic with a multicast flow identified using a combination of the common anycast address and the second multicast group, and
         in response to receiving the register-stop message for the common anycast address and the second multicast group from the RP for the second multicast group, refrain from sending subsequent PIM register messages for the second BUM traffic and drop the second BUM traffic.

* * * * *